J. O. FORD.
WAGON UNLOADING DEVICE.
APPLICATION FILED AUG. 4, 1919.
1,329,392.  Patented Feb. 3, 1920.
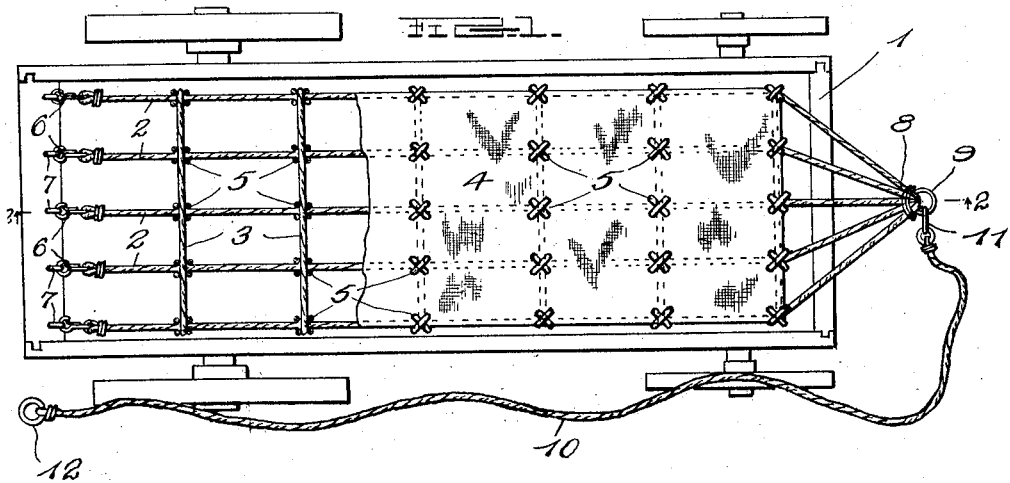
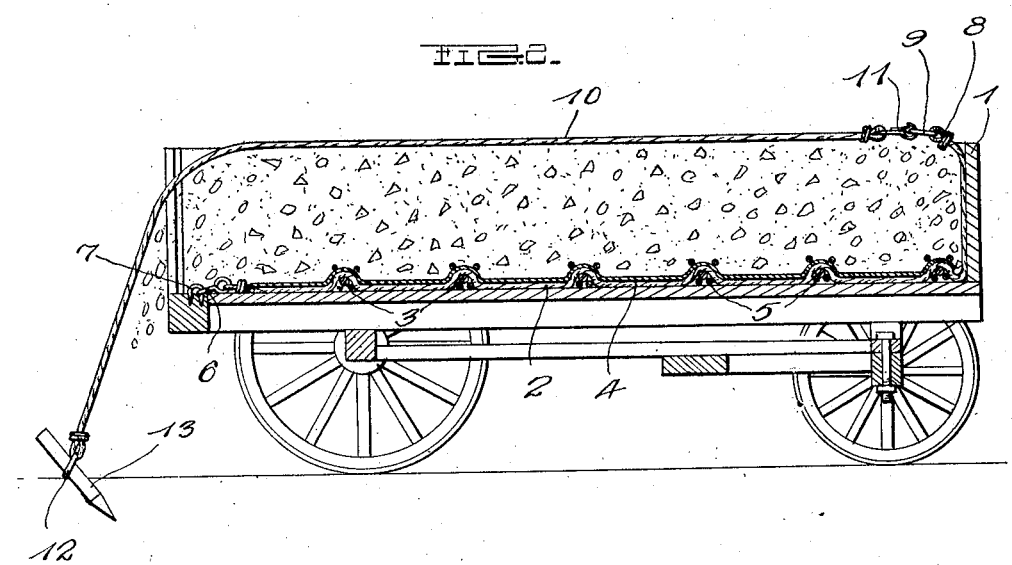
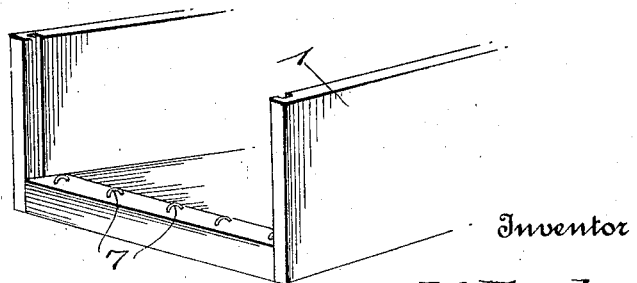
Witness
George H. Giovanietti
Inventor
J. O. Ford
By H. B. Willson &co.
Attorneys

UNITED STATES PATENT OFFICE.

JOHN OWEN FORD, OF JACKSONVILLE, TEXAS.

WAGON-UNLOADING DEVICE.

1,329,392.  Specification of Letters Patent.  Patented Feb. 3, 1920.

Application filed August 4, 1919. Serial No. 315,236.

*To all whom it may concern:*

Be it known that I, JOHN O. FORD, a citizen of the United States, residing at Jacksonville, in the county of Cherokee and State of Texas, have invented certain new and useful Improvements in Wagon-Unloading Devices; and I do declare the following to be a full, clear, and exact description of the invention, such as will enable others skilled in the art to which it appertains to make and use the same.

This invention relates to improvements in wagon unloading devices, and it has particular reference to a sling for unloading gravel, coal, sand and other fine materials from a wagon which has been loaded for purposes of transportation.

In devices of this class known to me, a series of longitudinal ropes and transverse ropes in the form of a sling have been employed, but such devices are not adaptable for carrying and unloading granular materials, such as sand and the like.

It is therefore the object of this invention to produce a sling that will carry and unload sand, coal, gravel, fertilizer and practically any and all like materials, of the granular type.

Another object of the invention is to provide a device of the above mentioned class which is extremely simple in construction, reliable in operation, strong, durable and inexpensive to manufacture.

Other objects and advantages of the invention will be apparent during the course of the following description.

In the accompanying drawings forming a part of this specification and in which like numerals are employed to designate like parts throughout the same, Figure 1 is a top or plan view, partly in section, illustrating the application of my invention to a wagon.

Fig. 2 is a longitudinal section on the line 2—2 of Fig. 1.

Fig. 3 is a perspective view of the rear end of a wagon.

In carrying out my invention, I employ a substantially flexible frame composed of a plurality of parallel longitudinally extending ropes. A second series of transverse ropes intersect the longitudinal ropes and space said ropes from each other. I extend a coarse fabric, such as canvas, over the ropes from end to end of the wagon, upon which sand and like materials can be loaded. I employ means to unite the canvas to both sets of ropes, and means to detachably secure the longitudinal ropes to the rear end of the wagon. The opposite ends of these ropes are secured to a ring, and a pull rope also secured to said ring. The pull rope is passed back over the load in the wagon and attached to a staple which is driven in the ground. Thus, it will be seen that when the team is driven forward the sand or material in the wagon will be caused to unload or dump on the ground.

In the drawings, wherein for the purpose of illustration is shown a preferred embodiment of my invention, the numeral 1 indicates a wagon of the usual construction to which my improved unloading device is attached.

The improved sling is constructed of a plurality of ordinary ropes 2 which are parallel with one another and extend longitudinally along the bed of the wagon. A second series of transverse ropes 3 intersect the ropes 2, as shown. These ropes 3 are preferably formed of stiff material, whereby the longitudinal ropes are spaced and held apart. A coarse fabric 4, such as canvas or the like, is stretched over the ropes 2 and 3 from end to end of the wagon. This fabric will permit sand, gravel and any other granular or like materials to be loaded thereon. In order to connect the canvas to the ropes, I preferably employ ties 5 which are passed through the said canvas and around the ropes 2 and 3 at their points of intersection, as shown, whereby the parts are securely united together to form a reinforced sling.

To the rear ends of the ropes 2 are suitably fastened spring snap fasteners 6 which are adapted to be detachably connected to staples 7 driven in the bed of the wagon as shown. The opposite ends of the ropes 2 are extended in advance of the foremost transverse rope 3 and converge toward each other as shown at 8 and are secured to a ring 9.

A pull rope 10, which is provided at one of its ends with a snap fastener 11, is detachably connected to the ring 9. The opposite end of the pull rope has a ring 12 suitably connected thereto which is adapted to be placed over an anchor member or stake 13 which is driven into the ground. Hence, it will be seen that when the pull rope is brought in a rearward direction over the top of the load, as shown in Fig. 2, and attached to the stake 13, and the wagon driven forward, the load will be rolled from the bed of the wagon on to the ground as will be readily understood.

Although I have described my invention as being particularly adapted for use in carrying and unloading sand and other granular materials, I desire it to be understood that the same is also readily adapted for use with various other material of the larger or coarser class.

Having thus described my invention, what I claim is:

An unloading device for wagons comprising a sling composed of a plurality of spaced longitudinally extending ropes, a second series of transverse ropes intersecting said longitudinal ropes and adapted to space said longitudinal ropes from each other, a fabric covering extending over said longitudinal and transverse ropes adapted to receive sand or like materials thereon, and ties passing through said covering and around said longitudinal and transverse ropes at their points of intersection to unite said covering and ropes, said longitudinal and transverse ropes extending beneath the entire area of the fabric covering and being in intimate contact therewith to reinforce the sling, means carried by one of the ends of the longitudinal ropes to detachably connect them to the rear end of the wagon bed, and a pull rope connected to the other ends of the last named ropes, substantially as described and for the purpose set forth.

In testimony whereof I have hereunto set my hand.

JOHN OWEN FORD.